Jan. 13, 1953
M. S. RESINA
2,625,313
HOPPER CAP FEEDER
Filed Sept. 15, 1947
4 Sheets-Sheet 1
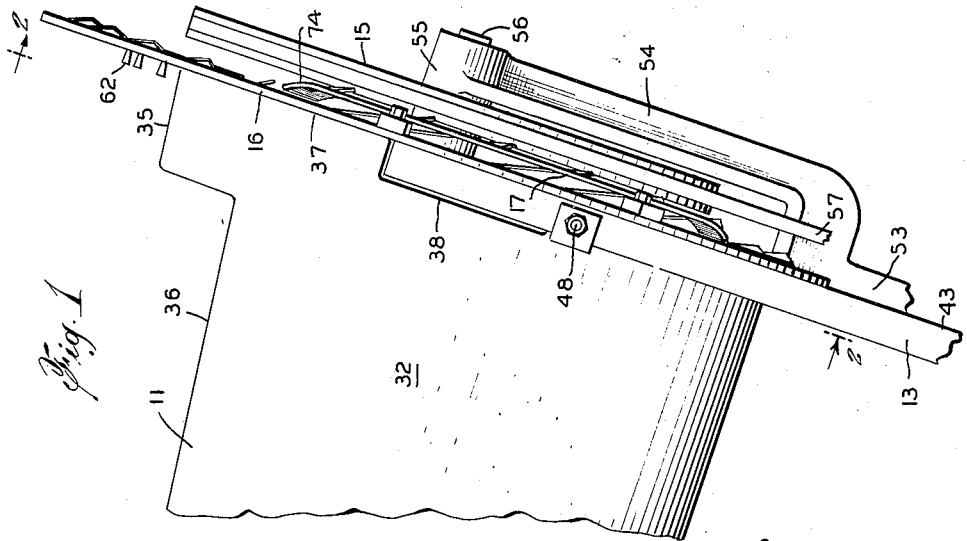
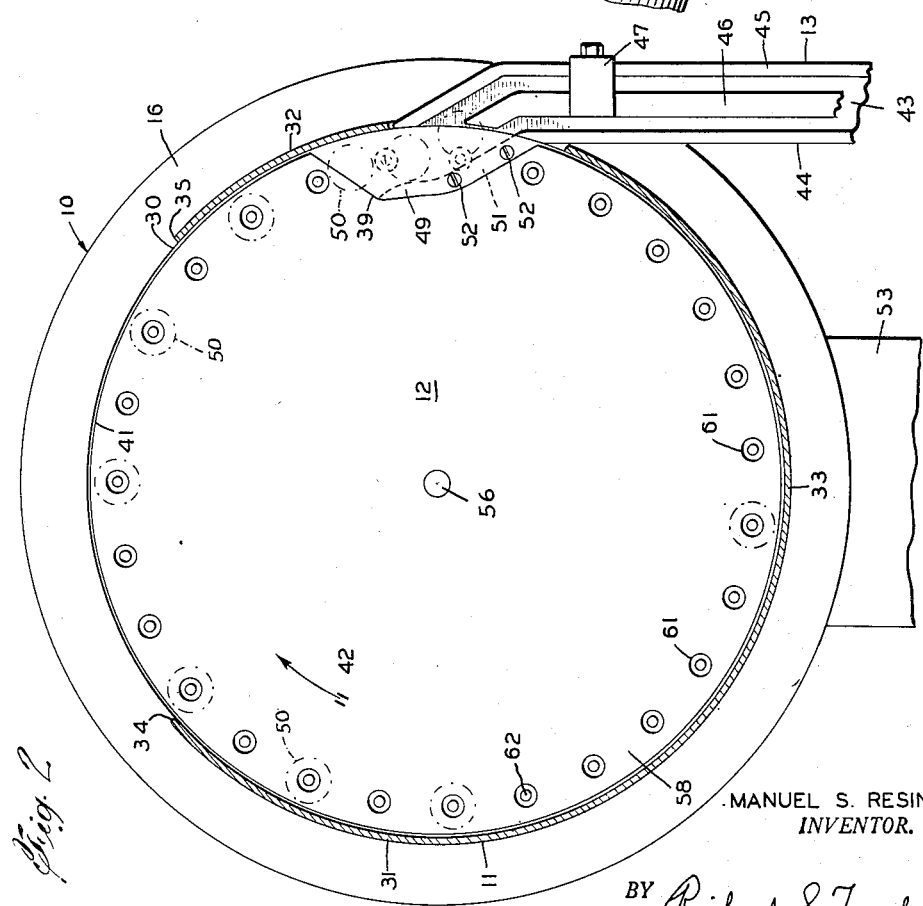
MANUEL S. RESINA
*INVENTOR.*
BY Richard S. Temko
attorney Jan. 13, 1953  M. S. RESINA  2,625,313
HOPPER CAP FEEDER
Filed Sept. 15, 1947  4 Sheets-Sheet 2
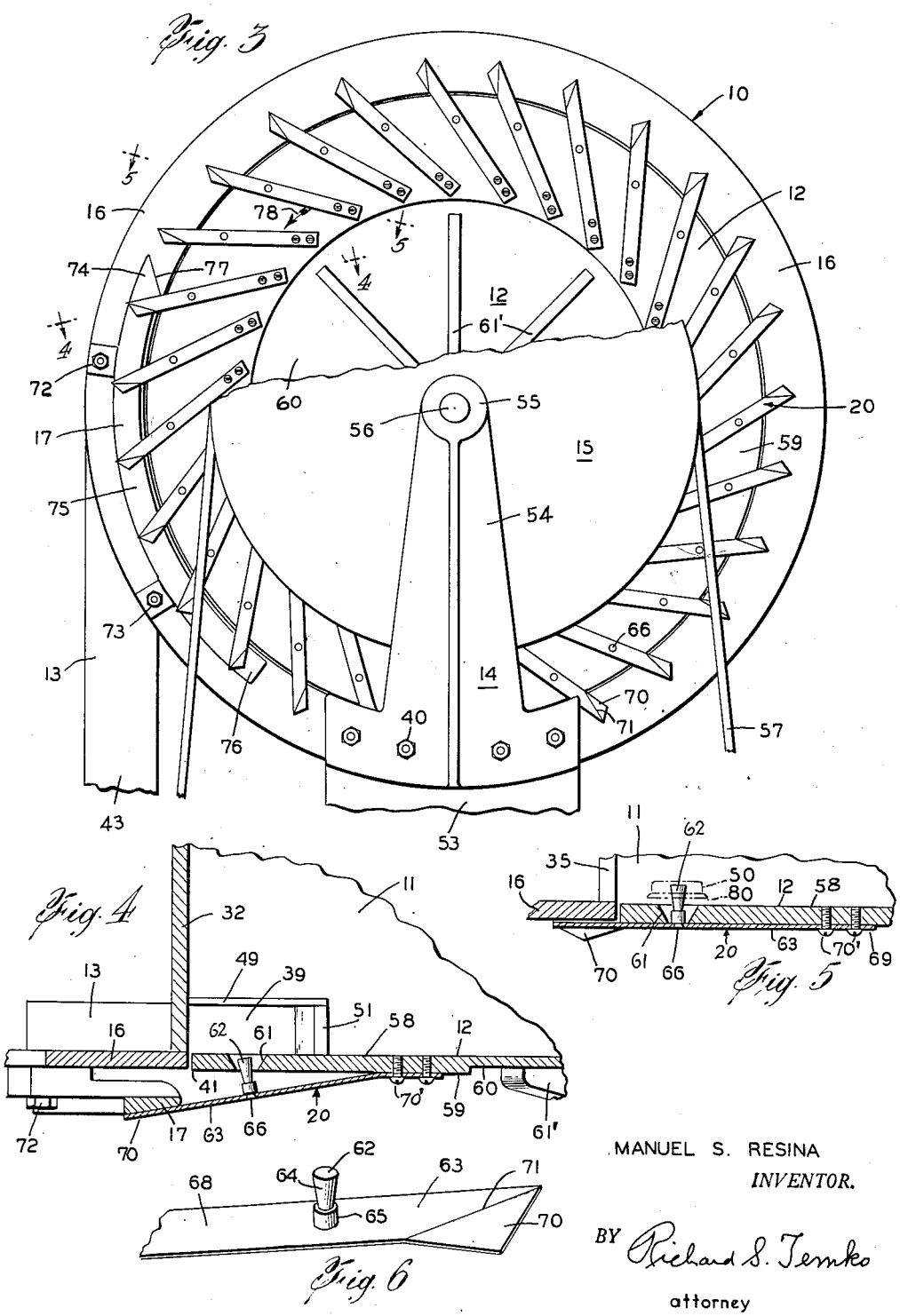
MANUEL S. RESINA
INVENTOR.
BY Richard S. Temko
attorney

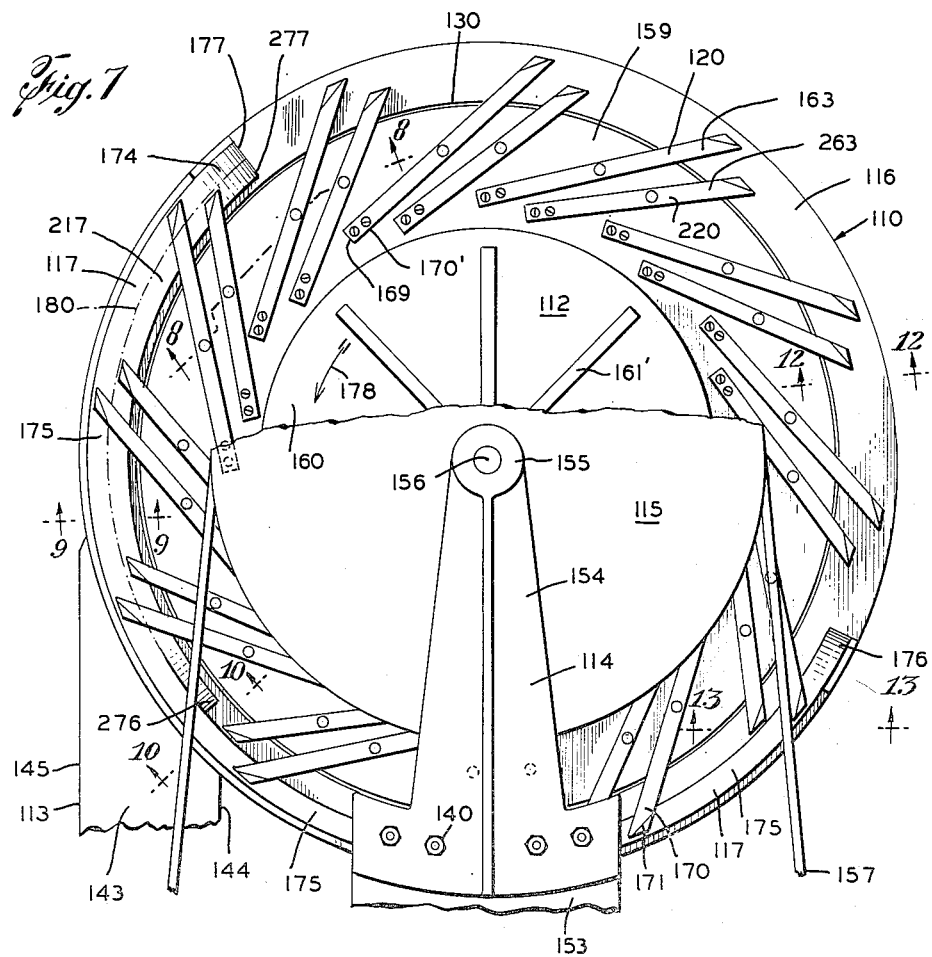

Jan. 13, 1953  M. S. RESINA  2,625,313
HOPPER CAP FEEDER
Filed Sept. 15, 1947  4 Sheets-Sheet 4
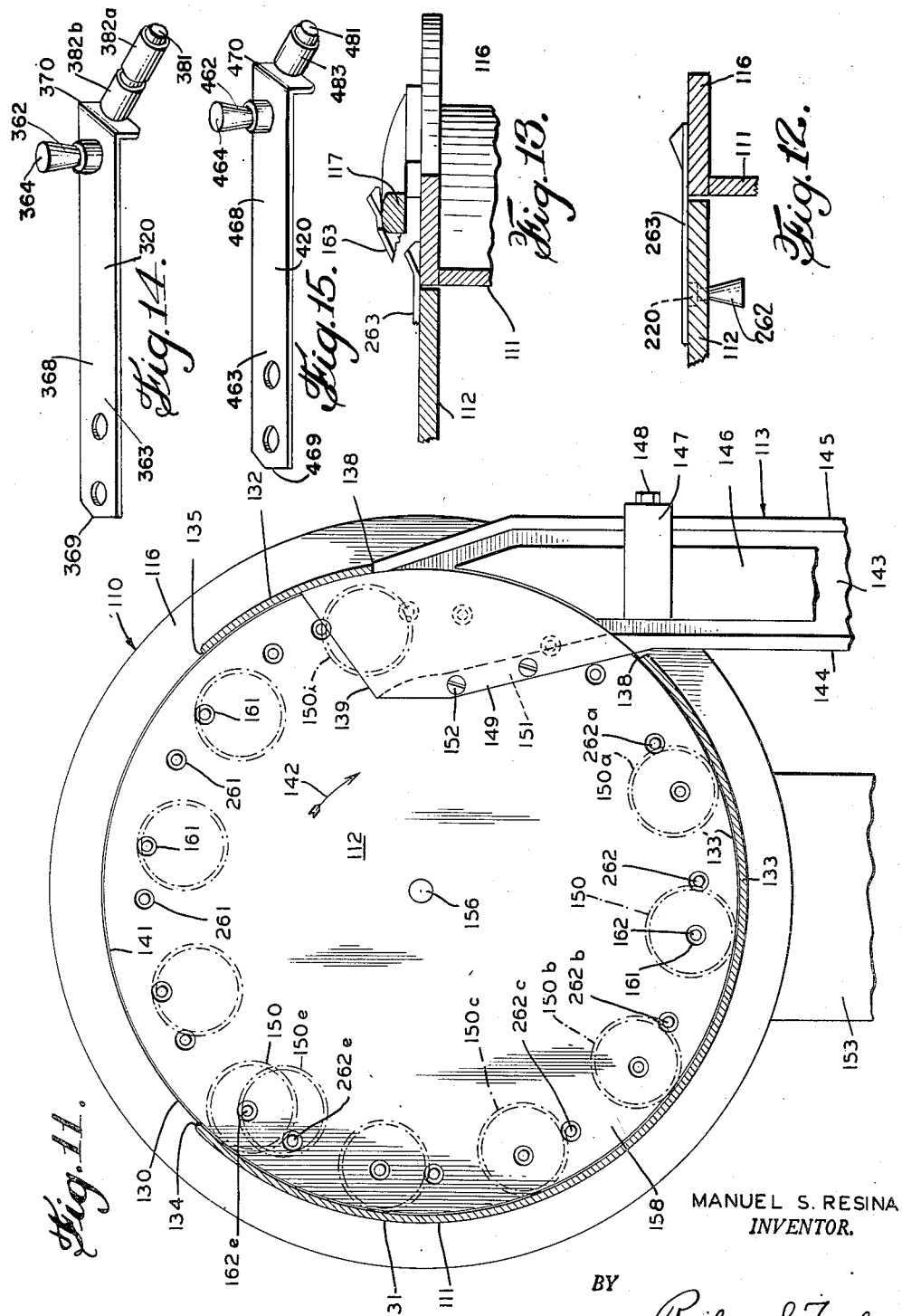
MANUEL S. RESINA
INVENTOR.
BY
Richard S. Temko
ATTORNEY

UNITED STATES PATENT OFFICE 2,625,313

HOPPER CAP FEEDER

Manuel S. Resina, Brooklyn, N. Y.; Rosa Resina, executrix of said Manuel S. Resina, deceased, assignor to Resina Automatic Machinery Co. Inc., Brooklyn, N. Y., a corporation of New York Application September 15, 1947, Serial No. 773,977

5 Claims. (Cl. 226—88.1)

This invention relates generally to hopper feeding and more particularly to a hopper cap feeder in which a plurality of individual caps are placed in a rotated hopper and from which the caps are discharged in series and in a predetermined position.

In connection with the automatic filling and/or capping of containers, it is known to place a relatively large number of caps or closures in a hopper and to discharge from the hopper or feed into a chute or other means, said caps or closures in an orderly and uniform arrangement. Since misplaced, improperly positioned or damaged caps seriously interfere with the normal high speed operation of the machine with which the present device is associated, it is of great importance that said device be capable of relatively long periods of continuous trouble-free operation.

It is therefore among the principal objects of the present invention to provide structure of the class described wherein the caps or closure elements are properly orientated and accurately positioned with respect to the mouth of the chute.

Another object herein lies in the provision of a plurality of pick-up elements which are resiliently associated with the main hopper plate and which have followers acted upon by a cam.

A feature of the invention lies in the fact that by virtue of the high operational efficiency of the device, it may be operated at relatively low speed with a reduction in noise and vibration as well as wear and tear upon itself.

Another object herein lies in the provision of a device of the character described wherein the discharge of the caps as they reach the mouth of the chute is positively caused to occur.

Another object herein lies in the provision of novel and useful pick-up members which by virtue of the shape and arrangement thereof tend to produce a higher ratio of collection and to retain the caps thereon until discharged into the chute.

A feature of the present invention lies in the fact that when the caps are discharged from the pick-up members, the movement is gradual so that the inertia of the cap is allowed for, so that the mouth of the chute may be relatively small with substantially no tendency for the caps to rebound out of the chute while the chute has capacity to take in more caps.

Another object herein lies in the provision of a device of the character described wherein, under conditions when the chute is full, undue pressures are not created so as to jam the caps in the chute and so that excess caps provided by the main hopper plate may return to the supply within the hopper without damage.

A further object herein lies in the provision of structure of the class described which is capable of handling a wide range of cap sizes.

Another object herein lies in the provision of hopper cap feeding structures having pick-up elements and pusher elements in separate groups, each of the said elements in a predetermined group being actuated by resilient fingers having rollers which are cam operated by separate cam portions.

These objects and other incidental ends and advantages will more fully appear in the progress of this disclosure and be pointed out in the appended claims.

In the drawings in which similar reference characters designate corresponding parts throughout the several views:

Fig. 1 is a fragmentary side elevational view of a hopper cap feeder in accordance with a first embodiment of the invention.

Fig. 2 is a fragmentary vertical sectional view partly in elevation as seen from the plane 2—2 on Fig. 1.

Fig. 3 is a fragmentary rear elevational view as seen from the right of Fig. 1.

Fig. 4 is an enlarged fragmentary sectional view as seen from the plane 4—4 on Fig. 3.

Fig. 5 is an enlarged fragmentary sectional view as seen from the plane 5—5 on Fig. 3.

Fig. 6 is an enlarged fragmentary view in perspective of the outer portions of one of the pick-up elements of the first embodiment.

Fig. 7 is a fragmentary rear elevational view of a second embodiment of the invention.

Fig. 8 is an enlarged fragmentary sectional view as seen along the line 8—8 on Fig. 7.

Fig. 9 is an enlarged fragmentary sectional view as seen from the plane 9—9 on Fig. 7.

Fig. 10 is an enlarged fragmentary sectional view as seen from the plane 10—10 on Fig. 7.

Fig. 11 is a fragmentary front elevational view of the second embodiment of the invention or as seen from the rear of Fig. 7.

Fig. 12 is an enlarged fragmentary sectional view as seen from the plane 12—12 on Fig. 7.

Fig. 13 is an enlarged fragmentary sectional view as seen from the plane 13—13 on Fig. 7.

Fig. 14 is a perspective view of one of the pick-up elements showing a third form thereof.

Fig. 15 is a perspective view of one of the pusher elements showing a third form thereof.

In accordance with the invention, the device, generally indicated by reference character 10, may include broadly a hopper 11, a main hopper plate 12, a chute 13, a mounting bracket 14, a drive pulley or sheave 15, a guide ring 16, a cam 17 and a plurality of pick-up elements 20.

The hopper 11 is stationary, being mounted upon and projecting forwardly from the inner edge 30 of the guide ring 16. The hopper 11 is generally in the form of a partial cylinder having lateral wall portions 31 and 32 and a bottom wall portion 33. Upper edges 34 and 35 of the lateral wall portions 31 and 32 respectively are stepped down in a forward direction (see Fig. 1) to provide an enlarged opening 36 through which the caps generally indicated by reference character 50 are loaded. The rear edge 37 of the lateral wall portion 32 is forwardly indented to form the edge 38. The edge 38 is spaced sufficiently from the guide ring 16 to permit the penetration therethrough of the chute 13, the mouth 39 of which is disposed within the hopper and immediately forwardly of the main hopper plate 12.

The ring 16 is stationary, being mounted upon a bracket 14 in any suitable manner as by the bolts 40. The ring 16 and the main hopper plate 12 are preferably substantially coplanar when in operative position. The inner edge 30 of the guide ring 16 is spaced from the outer edge 41 of the main hopper plate 12 a distance sufficient only to provide adequate clearance so that the parts do not undesirably rub when the main hopper plate 12 is rotated in the direction of the arrow 42.

The chute 13 includes a rear wall 43, side walls 44 and 45 and a detachable front wall 46. The front wall 46 is of less width than the distance between the inner opposed surfaces of the side walls 44 and 45 to permit inspection of the caps disposed within the chute and to permit the insertion between said space of a pointed tool (not shown) for the purpose of moving the closure caps 50 should the chute become clogged. The front wall 46 has connected thereto an attachment bracket 47, generally of L-shape which is detachably secured to the side wall 45 by the bolt 48. The upper end of the chute 13 is of irregular shape best seen in Figures 2 and 4 so that the mouth 39 is properly positioned with respect to the caps 50 as they are moved to a position for discharge into the chute. The auxiliary front wall 49 for the chute 13 is provided and this is secured to the thickened side wall portion 51 in a detachable manner by suitable means as, for example, first screws 52 which penetrate suitably positioned orifices in the auxiliary front wall 49 and threadedly engage the side wall portion 51. The arrangement and positioning of the parts constituting the upper end of the chute 13 are such that once a cap or caps 50 has been deposited therein, said caps are prevented from leaving the chute and are guided in a downward direction within the chute to travel to any desired capping machine, or the like (not shown).

The mounting bracket 14 includes a base portion 53 which is connected in a stationary manner with some portion of the machine with which the present device is used, said machine not being shown in the drawings. The upper portion 54 of the bracket 14 is rearwardly offset to provide sufficient room for the drive pulley 15. The upper end of the bracket 14 is enlarged to form a bearing 55 in which is journalled the shaft 56. The drive pulley 15 and the main hopper plate 12 are fixed to the forward position of the shaft 56.

The sheave 15 is provided with a belt 57 which may be driven in any suitable manner as by an electric motor, not shown. The front surface 58 of the main plate 12 is preferably smooth while the rear surface 59 is provided with a central depression 60 and a plurality of radiating stiffening ribs 61'. Spaced inwardly from the outer edge 41 thereof, the plate 12 is provided with a plurality of orifices arranged in a circle. The orifices 61 taper outwardly in a forward direction so as to have frusto-conically shaped walls. The holes 61 are equidistantly spaced, from each other, and from the shaft 56.

The pick-up elements 20 are substantially identical, so that a detailed description will suffice for all. A pick-up element 20 includes a pick-up member 62 and a follower arm 63. A pick-up member 62, includes an outer terminal 64 which is frusto-conical in shape and the walls of which converge in the direction of base. The rear terminal 66 penetrates a counter-sunk opening in the follower arm 63 wherein it is headed over so as to be riveted in place. The pick-up member 62 projects perpendicularly from the forward surface 68 of the follower arm 63. The length of the pick-up member 62 is sufficient so that the outer terminal, or a substantial portion thereof projects forwardly from the front surface 58 when the follower arm 63 is in the relaxed or normal position thereof. This is shown in Figure 5 of the accompanying drawing. The base 65 is cylindrical in shape.

The follower arm 63 is preferably composed of resilient material as, for example, Phosphor bronze. The inner end 69 of the follower arm 63 is detachably secured to the main hopper plate 12 by the screws 70' which penetrate orifices in the follower arm 63 and threadedly engage correspondingly positioned orifices in the plate 12. The outer end 70 of the follower arm 63 is rearwardly bent to form a lip, the bend 71 being radially arranged with respect to the shaft 56 when the follower arm is mounted. The lip 70 prevents the follower arm 63 from passing forwardly of the cam 17.

All of the follower arms 63 are angularly arranged so that the outer ends thereof lean forwardly in the direction of rotation of the main plate 12. This is best seen in Figure 3. The outer ends 70 project beyond the edge 41 a distance sufficient to engage the cam 17 during normal operation.

The cam 17 is generally arcuately shaped and is secured to the guide ring 16 preferably by the bolts 72 and 73. The cam 17 has a rise 74, an elongated dwell 75 and a fall 76. The leading edge 77 of the cam 17 is angularly arranged, tapering toward the outer edge of said cam 17, in a direction contra to the direction of normal rotation of the plate 12 (see the arrow 78) in Figure 3.

The rise portion 74 of the cam 17 extends rearwardly with respect to the device 10, a distance sufficient to completely retract the pick-up members 62, which position is shown in Figure 4. The dwell portion 75 extends for a substantial distance, so that pick-up member 62 is retained in a retracted position until it has reached a lower portion of the hopper 11. This causes the pick-up members 62 to enter the mass of the caps 50 (not shown) which congregate upon the lower rear portion of the bottom wall 33, even when there are a relatively small number of caps 50 in the hopper 11. The fall portion 76 of the cam 17 allows the follower arms 63, as they reach this point, to move forward under the action of their own resiliency to their normal position, in which the forward surfaces 68 thereof contact the rear surface 59 of the plate 12.

*Operation*

In the operation of the device 10, a supply of the caps 50 are placed within the hopper 11 through the opening 36. As the pulley 15 is rotated by the belt 57, the main hopper plate 12 is caused to rotate in the direction of the arrow 78. The pick-up members 62 enter hollow or concave portions of the caps 50 so that said caps become suspended therefrom. Individual caps take the position shown in Figure 5. The caps 50 are carried around in a circular manner with the edge 80 thereof gliding upon the surface 58. The shape of the outer terminal 64 tends to cause the cap to remain on the pick-up members 62 during their travel. When a given pick-up member 62 reaches a position directly above the mouth 39 of the chute 13, the cam 17 retracts the pick-up member, so that the particular cap, no longer supported, falls under the action of gravity into the mouth 39 of the chute 13. The dwell portion 75 keeps pick-up members 62 retracted so that they do not become caught by the side wall portion 51.

The process is continuous and should the chute 13 become full of the caps 50, excess caps dropped above the mouth 51 will merely roll off the topmost cap within the chute and fall back into the supply within the lower portion of the hopper 11.

Servicing of the device, when required, is a simple matter. In the event that any one of the pick-up elements 20 becomes worn or damaged, it becomes necessary only to remove and replace the screws 70' in order to replace the defective pick-up element.

Turning now to the second embodiment of the invention, illustrated in Figs. 7 to 13 inclusive, for the purpose of avoiding needless repetition, certain of the parts corresponding to the first embodiment are given the same reference characters with the addition of the prefix "1."

The second embodiment differs from the first embodiment principally in an opposite inclination of the pick-up elements with respect to their direction of motion and in the incorporation of structure which permits handling a relatively large range of cap sizes.

The difference in pick-up angularity may be readily discerned by a comparison of Fig. 7 with Fig. 3. This arrangement of the pick-up elements in the second embodiment provides a smoother action as when the outer ends of the follower arms 163 and 263 become worn, they do not catch upon the edges 177 and 277 of the cams 117 and 217 to buckle and break. For the purpose of clarity in the disclosure, the cams 217 and 117 are described as separate cams located inwardly and outwardly respectively of the dot-dash line 180. As shown however, they may, for lower cost manufacture and assembly, be made integral. When spring fingers 163 or 263 become excessively worn, this is evidenced by insufficient movement of the corresponding pick-up members 162 and pusher members 262 and can be replaced without damage to other parts.

The structure which enables the device 110 to handle a greater range of cap sizes is produced by a greater spacing between the pick-up elements 120 and the provision of an equal number of pusher elements 220 which are positioned behind the pick-up elements in conjunction with which they coact. Thus the pusher elements 220 are each displaced a short distance in a counter-clockwise direction (see Fig. 11), with respect to the pick-up elements 120 with which they cooperate where the pick-up elements (and the main hopper plate 112) rotate in a clockwise direction. The pusher elements 220 are spaced from each other preferably a distance slightly greater than a chord on the largest size cap 150 it is desired to manipulate said chord being measured between a juxtaposed pair of pusher elements when the rim of the cap is resting on the inner or upper surface 133' of the bottom wall. The said chord must be taken sufficiently close to the center of a cap (or its center of gravity) so that the cap does not roll down over the then lowermost pusher element which is acting to elevate the cap.

The pick-up members 162 are normally projected through the orifices 161 and the pusher members 262 normally project through the orifices 261. The members 162 and 262 are withdrawn so that their terminals thereof, 164 and 264 may lie flush with or rearwardly of the front surface 158 by the cams 117 and 217, respectively. Cam 117 has an edge 177, a rise 174, a dwell 175, and a fall 176. Cam 217 has an edge 277, a rise 274, a dwell 275, and a fall 276. The cams 117 and 217 are so arranged that when the pick-up members 163 are at their lowest position they are retracted to or behind the plate 112 while the pusher members are projected forward of said plate 112. As so projected, the pusher member 262a, for example, may engage a relatively rear edge portion of a cap 150a. As the pusher elements rotate clockwise and move upward they may take successive positions, indicated by reference characters 262b and 262c, while the caps may take successive positions, indicated by reference characters 150b and 150c.

Thus, when pusher elements 220 move forward on the fall 276, they enter the trough of the hopper so that the pusher members 263 can engage caps to elevate them, as said pusher fingers move orbitally. As the follower arms 163 move forwardly on the fall 176, they either enter the hollow depression of a cap 150 or if they engage the convexity of the cap 150, they kick it back into the pile of caps (not shown) which lie in the lower portions of the hopper 111.

As a given pusher member 263 goes to the left of the center of gravity of a cap 150 (see member 262c on Fig. 11), said cap falls to a position indicated at 150c to be suspended upon the pick-up member 162c.

The follower arms 163 and 263, as they move rearward upon striking the cam rises 177 and 277, are retracted to let the particular cap, as for example the cap 150i, drop into the mouth 139, which is at least as wide as the diameter of the largest cap that the hopper cap feeder will handle.

It may thus be seen that the distance between any juxtaposed pair of pusher members 262 is greater than the chord of any expected cap. Because the caps fall between the pusher members while the pick-up member is retracted, adequate feed to the mouth 139 of the chute 113 is maintained when only a small number of caps are in the hopper 111. At a point on the way up, corresponding generally to about 45° or 10:30 o'clock, the in between pick-up member comes forward to either hook the open cap or kick it off if it is wrong side out. The pick-up members 162 are placed nearer to the next adjacent counter-clockwise pusher members 262 because by virtue of this structure a greater range of cap sizes can be handled for a given spacing between the pusher members 262.

Turning now to the third form of pick-up and pusher elements 320 and 420, respectively, shown in Figs. 14 and 15, here the resilient follower arms 363 and 463 at their inner ends 369 and 469 are orificed for securing them to the main hopper plate 12 or 112. The forward surfaces 368 and 468 carry the members 362 and 462. The outer ends of the arms are bent at 370 and 470 and have secured thereto the pins 381 and 481 upon which are journalled the rollers 382a, 382b and 483. The rollers 382a, 382b and 483 are preferably composed of porous metal which is oil soaked. This reduces friction, noise and wear between the outer ends of the follower arms and the cams 117 and 217.

I wish it to be understood that I do not desire to be limited to the exact details of construction shown and described, for obvious modifications will occur to a person skilled in the art.

I claim:

1. A hopper cap feeder for use with caps having a concavity and inner and outer peripheries, comprising: a main hopper plate which is rotatable; means to rotate said plate; a plurality of pusher elements mounted on said plate and movable with respect thereto; a plurality of pick-up elements movably mounted on said plate and alternating in position with respect to said pusher elements; said pusher elements and pick-up elements including pusher members and pick-up members respectively; said members in the active position thereof being located forwardly of said plate and in the inactive position thereof located rearwardly of the forward surface of said plate; and means to move the pick-up elements independently of the pusher elements; said pusher elements serving to position said caps whereby they may be engaged by said pick-up elements at which point said pusher elements contact portions of the outer peripheries of said caps, said pick-up elements contacting said inner peripheries of said caps.

2. A hopper cap feeder for use with caps having a concavity and inner and outer peripheries, comprising: a main hopper plate which is rotatable; means to rotate said plate; a plurality of pusher elements mounted on said plate and movable with respect thereto; a plurality of pick-up elements movably mounted on said plate and alternating in position with respect to said pusher elements; said pusher elements and pick-up elements including pusher members and pick-up members respectively; said members in the active position thereof being located forwardly of said plate and in the inactive position thereof located rearwardly of the forward surface of said plate; and cam means to move the pick-up elements independently of the pusher elements; said pusher elements serving to position said caps for engagement by said pick-up elements at which point said pusher elements contact portions of the outer peripheries of said caps, said pick-up elements contacting said inner peripheries of said caps.

3. A hopper cap feeder for use with caps having a concavity and inner and outer peripheries, comprising: a main hopper plate which is rotatable; means to rotate said plate; a plurality of pusher elements mounted in a circle on said plate and movable with respect thereto; a plurality of pick-up elements movably mounted in a circle on said plate and alternating in position with respect to said pusher elements; said pusher elements and pick-up elements including pusher members and pick-up members respectively; said members in the active position thereof being located forwardly of said plate and in the inactive position thereof located rearwardly of the forward surface of said plate; and means to move the pick-up elements independently of the pusher elements; said pusher elements serving to position said caps for engagement by said pick-up elements at which point said pusher elements contact portions of the outer peripheries of said caps, said pick-up elements contacting said inner peripheries of said caps.

4. A hopper cap feeder for use with caps having a concavity and inner and outer peripheries comprising: a main hopper plate which is rotatable; means to rotate said plate; a plurality of pusher elements mounted on said plate, having rollers on the ends thereof, and movable with respect thereto; a plurality of pick-up elements movably mounted on said plate, having rollers on the ends thereof and alternating in position with respect to said pusher elements; said pusher elements and pick-up elements including pusher members and pick-up members respectively; said members in the active position thereof being located forwardly of said plate and in the inactive position thereof located rearwardly of the forward surface of said plate; and means to move the pick-up elements independently of the pusher elements including a cam coacting with said roller; said pusher elements serving to position said caps for engagement by said pick-up elements at which point said pusher elements contact portions of the outer peripheries of said caps, said pick-up elements contacting said inner peripheries of said caps.

5. A hopper cap feeder for use with caps having a concavity and inner and outer peripheries, comprising: a main hopper plate which is rotatable; means to rotate said plate in a predetermined direction; a plurality of pusher elements mounted on said plate and movable with respect thereto; a plurality of pick-up elements movably mounted on said plate and alternating in position with respect to said pusher elements; said pick-up elements being closer to the pusher elements which follow them than to the pusher elements which precede them, in the said predetermined direction; said pusher elements and pick-up elements including pusher members and pick-up members respectively; said members in the active position thereof being located forwardly of said plate and in the inactive position thereof located rearwardly of the forward surface of said plate; and means to move the pick-up elements independently of the pusher elements; said pusher elements serving to position said caps for engagement by said pick-up elements at which point said pusher elements contact portions of the outer peripheries of said caps, said pick-up elements contacting said inner peripheries of said caps.

MANUEL S. RESINA.

REFERENCES CITED

The following references are of record in the file of this patent:

UNITED STATES PATENTS

| Number | Name | Date |
| --- | --- | --- |
| 640,470 | Jewett | Jan. 2, 1900 |
| 726,972 | McCollister | May 5, 1903 |
| 1,016,265 | Hall, Sr. | Feb. 6, 1912 |
| 1,042,922 | Johnson | Oct. 29, 1912 |
| 1,801,728 | Doble | Apr. 21, 1931 |
| 2,033,988 | Johnson | Mar. 17, 1936 |